United States Patent
Comfort et al.

(10) Patent No.: US 10,520,333 B2
(45) Date of Patent: Dec. 31, 2019

(54) SELF-POWERING SMART WATER METER SYSTEM AND METHOD

(71) Applicant: AQUA COMMAND LIMITED, Hove (GB)

(72) Inventors: John Jervis Comfort, Hove (GB); Nicola Josephine Randles, Hove (GB); Phillip John Van Tenac, Hove (GB)

(73) Assignee: AQUA COMMAND LIMITED, Hove (GB)

( * ) Notice: Subject to any disclaimer, the term of this patent is extended or adjusted under 35 U.S.C. 154(b) by 0 days.

(21) Appl. No.: 15/766,449

(22) PCT Filed: Oct. 7, 2016

(86) PCT No.: PCT/IB2016/056026
§ 371 (c)(1),
(2) Date: Apr. 6, 2018

(87) PCT Pub. No.: WO2017/060872
PCT Pub. Date: Apr. 13, 2017

(65) Prior Publication Data
US 2019/0086233 A1    Mar. 21, 2019

(30) Foreign Application Priority Data
Oct. 8, 2015 (GB) .................................. 1517849.4

(51) Int. Cl.
*G01D 4/00* (2006.01)
*G01F 15/00* (2006.01)
*G01F 15/06* (2006.01)
*G01F 25/00* (2006.01)

(52) U.S. Cl.
CPC ........... *G01D 4/002* (2013.01); *G01F 15/001* (2013.01); *G01F 15/063* (2013.01); *G01F 25/0007* (2013.01)

(58) Field of Classification Search
CPC combination set(s) only.
See application file for complete search history.

(56) References Cited

U.S. PATENT DOCUMENTS 4,940,976 A * 7/1990 Gastouniotis .......... G01D 4/004
136/205
9,400,192 B1 * 7/2016 Salser, Jr. .............. G01D 4/002
(Continued)

FOREIGN PATENT DOCUMENTS

| CN | 204679185 U | 9/2015 |
| EP | 2048482 A1 | 4/2009 |
| WO | 2011072625 A1 | 6/2011 |

OTHER PUBLICATIONS

TE Technology, Inc., Thermocelectric Coling Assembly (TCA) Instruction Manual, 2009, TE Technology, Inc., Drawing 4921-1 Rev. C, Jul. 2, 2009. (Year: 2009).*
(Continued)

*Primary Examiner* — Nabil H Syed
*Assistant Examiner* — Cal J Eustaquio
(74) *Attorney, Agent, or Firm* — Wayne V. Harper

(57) ABSTRACT

A fluid fluid or water meter system includes a fluid supply and a receiving center. 20, 30 connected via a supply line 21. Further, a fluid metering member 40 is coupled to the supply line 21, and includes a fluid regulating member 41 to regulate the fluid therethrough, and a data transceiver 42, coupled to the fluid regulating member 41 to regulate the supply of fluid. A self-power generating source is also provided for the continuous charging of the fluid metering member. Various self-generating sources, such as, a thermoelectric generator, a water battery, a power turbine, and radio spectrum may be used for said purpose. The system can be provided with rechargeable battery for charging the battery and storing power. Moreover, a network operation center 60 is further developed to include information technology and (Continued)

information technology. 40. Further in an optional embodiment, including the smart system, including an Artificial Neural Network (ANN) module 2030 for self-training. The self-taught smart system identifies individual events (eg, flushing, showering, washing machine cycles, etc.), and limiting the flow of the total volume.

13 Claims, 7 Drawing Sheets

(56) References Cited

U.S. PATENT DOCUMENTS

| | | | |
|---|---|---|---|
| 2007/0107766 A1* | 5/2007 | Langley, II | H02J 17/00 |
| | | | 136/243 |
| 2007/0227572 A1 | 10/2007 | Piasecki et al. | |
| 2009/0096619 A1* | 4/2009 | Felske | B63C 11/02 |
| | | | 340/612 |
| 2009/0309755 A1 | 12/2009 | Williamson et al. | |
| 2013/0211329 A1* | 8/2013 | Kamatani | A61M 5/16831 |
| | | | 604/111 |

OTHER PUBLICATIONS

Khode et al., Review on Application of Termoelectric Peltier Module in cooling and power generation Technology, Jan. 1, 2015, International Journal of Engineering and Technical Research (IJETR), ISSN:2321-0869, vol. 3, Issue-1 (Year: 2015).*

* cited by examiner

SELF-POWERING SMART WATER METER SYSTEM AND METHOD

FIELD

The present disclosure relates generally to fluid or water management systems and methods. More specifically, the present disclosure relates to a self-powering smart fluid or water management systems and methods.

BACKGROUND

Water/fluid meters are utilized to measure volume of water/fluid usage. For example, in some countries, water/fluid meters are used at each residential and commercial building in a public water supply system. To the extent that conventional water/fluid meters can transmit usage data, these meters are typically capable of transmitting data only relatively infrequently due to power issues and other constraints. Water/fluid meters may utilize a limited power source, such as a battery, to power the meter. As a result, the batteries in a water/fluid meter may be replaced by an operator every 6 to 12 months. If the power source is rechargeable, it may not be easily recharged because water/fluid meters are not typically connected to an external power source. Further, after 3-5 years of operation, wear and tear may require meters to be recalibrated. Worn meters may over or under read the amount of water/fluid passing through the meter and it may require significant effort and expense to systematically check and calibrate individual meters in a given service area. Additionally, the dimension of a typical water/fluid meter do not necessitate placement of water/fluid meters in the walls of a building or the like.

Further, the conventional water/fluid meters are not self-trained to take real time fail-safe actions. Therefore, water/fluid meter systems and methods discussed herein that provide a wireless communication, combination of self-generating energy, self-trained module and/or rechargeable energy storage may provide significant improvements over currently available water meters. Additionally, the water meter systems and methods are operable in low flow conditions, and can achieve a high turndown ratio.

SUMMARY

An object of the present invention is to provide a method and a system that can monitor water/fluid flow across the system.

An object of the present invention is to provide a method and a system that can communicate information of the amount of water/fluid flowing through a meter to a remote data center.

A further object of the present invention is to provide a method and a system to produce and supply continuous and sufficient power to a water/fluid meter system for calculating and communicating the amount of water/fluid flow information to a local control unit for executing fail-safe and self-training measures.

A further object of the present invention is to provide a method and a system that can locally and/or remotely regulate/shut off the water/fluid flow through a water/fluid system.

In one aspect, a fluid meter system may be provided. The system may include at-least one fluid supplying center, at-least one fluid receiving center, at-least one fluid metering member, at-least one self-power generating source and at-least one network operation center. The fluid supplying center includes at-least one supply line. The fluid receiving center is connected to the fluid supplying center via the supply line. Further, the fluid metering member is coupled to the supply line. In one embodiment, the fluid metering member includes at-least one fluid regulating member and at-least one data transceiver. The fluid regulating member is configured to regulate the supply of fluid through the supply line, and the data transceiver is coupled to the fluid regulating member to collect a plurality of data related to the supplied fluid through the supply line. Furthermore, the self-power generating source is electrically coupled to the fluid metering member to generate power required to power the fluid metering member for operation of the data transceiver. Moreover, the network operation center is wirelessly coupled to receive the plurality of data related to the supplied fluid through the supply line via the data transceiver to process and exchange relevant information or command to at-least one of the fluid supplying center, fluid receiving center and the fluid metering member.

In one embodiment, the self-power generating source may be a thermoelectric generator power source. The thermoelectric generator power source, in one example, may be based on a Peltier device using the "Seebeck effect" to generate power based on heat differences of surrounding and fluid. As per this example embodiment, the thermoelectric generator power source may include an arrangement of a through pipe having couplers, a thermal transfer block, a heat-sink element, a Peltier device, a printed-circuit board (PCB), and, a casing configuration to accommodate and support the arrangement of the through pipe, the thermal transfer block, the heat-sink element, the Peltier device and the PCB. The through pipe having the couplers that are coupled at both opposite end portions, of the through pipe to be coupled with supply pipe to enable the flow of fluid therethrough. In general example, the fluid flowing through the supply line and through the through pipe may be cold fluid. Further, the thermal transfer block includes a through recess to accommodate the through pipe and sense the temperature of the fluid. The heat-sink element may be adapted to sense ambient air temperature from surrounding. The ambient air temperature in a general example may be higher temperature than the fluid, otherwise, vice versa my also possible. The Peltier device may be disposed around the thermal transfer block and covered via the heat-sink element to be in direct contact therewith to sense and convert the temperature differential across the heat sink element and the through pipe, and resulting heat flow therethrough, into a voltage. The PCB may be disposed around the thermal transfer block and electrically coupled to the Peltier device to supply the voltage to the fluid metering member for continuous operation. In one embodiment, the PCB may include a self-oscillating step up transformer and an initial regulator for channelizing the voltage. Further, the PCB may also include a voltage doubler or further step up stage to generate a resultant voltage up to the right level depending upon the requirement based on the channelized voltage.

In one embodiment, the fluid receiving center may be coupled to the supply line via at-least one fluid receiving line, and the fluid metering member is placed between the supply line and the fluid receiving line. In such embodiment, the self-power generating source may also be a thermoelectric generator power source (not shown) configured to generate power based on the temperature difference between the fluid of the supply line and the fluid receiving line to power the fluid metering member for continuous operation, as compared to ambient air temperature.

In one embodiment, the self-power generating source may be a water battery source having a plurality of water containing containers to generate power to power the fluid metering member for continuous operation.

In one embodiment, the self-power generating source may be a turbine power generation source to generate power to power the fluid metering member for continuous operation. In one further embodiment, the turbine power generation source and the thermoelectric generator power source in combination may be adapted to generate power to power the fluid metering member for continuous operation.

In one embodiment, the self-power generating source may be a radio spectrum power generating source adapted to generate power to power the fluid metering member for continuous operation.

In one embodiment, the system may further include a rechargeable battery to store the power generated by any or all the self-power generating source.

In one example, the fluid supplying center may include at-least one water treatment plant for water treatment, at-least one water storage unit to store the treated water, at-least one pumping station to supply the stored treated water to the water receiving center.

In one example, the network operation center may include a communication transceiver, a data server and a data storage. The communication transceiver may be adapted to receive the plurality of data related to the supplied fluid through the supply line by the data transceiver, and send related signal or information. Further, the data server may receive the sent signal or information from the communication transceiver to process and exchange relevant information or command or data to at-least one of the fluid supplying center, fluid receiving center and the fluid metering member. The data storage may store the data or information from the data server.

The system may further include a mobile field technician to receive the information from the network operation center and respond accordingly. In further embodiment, the system may further include an emergency response center to receive the information from the network operation center and respond accordingly.

In further aspect, a fluid management system is provided. The system may include a fluid flow arrangement, a power management arrangement and a processing arrangement. The fluid flow arrangement includes connection from at-least one fluid supplying center to at-least one fluid receiving center via a supply line. The flow arrangement having at-least one fluid metering member, such as the fluid metering device, coupled to the supply line. Further, the power management arrangement may be coupled to the fluid flow arrangement to enable fluid flow measurement. The power management arrangement may include at-least one power generating source and a rechargeable battery to be charged by the power generating source. Furthermore, the processing arrangement may include a real time clock, and coupled to the fluid flow arrangement to receive the plurality of data, and coupled to the power management arrangement to be powered. The real time clock adapted to time-stamp events and wake-up processing arrangement to send the plurality of data on the real time basis.

In one further aspect, a water meter method is provided. The method includes the steps of:

flowing fluid from at-least one fluid supplying center to at-least one fluid receiving center via at-least one supply line;

collecting plurality of data related to the supplied fluid through the supply line via a fluid metering member and sending the said data;

self-powering the fluid metering member coupled to the supply line to continuous operation collecting and sending data; and receiving the plurality of data related to the supplied fluid through the supply line and processing the said data to act accordingly.

The step of self-powering further includes thermoelectrically charging the fluid metering devices via a thermoelectric generator power source. The thermoelectric generator power source includes:

a through pipe having couplers at both opposite end portions, the through pipe enable a flow of fluid therethrough, the fluid being cold;

a thermal transfer block having a through recess to accommodate the through pipe and sense the temperature of the fluid;

a heat-sink element adapted to sense ambient air temperature from surrounding, the ambient air temperature being hotter;

a Peltier device disposed around the thermal transfer block and covered via the heat-sink element to be in direct contact therewith to sense and convert the temperature differential across the heat sink element and the through pipe, and resulting heat flow therethrough, into a voltage; and a printed-circuit board (PCB) disposed around the thermal transfer block and electrically coupled to the Peltier device to supply the voltage to the fluid metering member for continuous operation, wherein the PCB comprises:

a self-oscillating step up transformer and an initial regulator for channelizing the voltage; and a voltage doubler or step-up converter to generate a resultant voltage up to the right level depending upon the requirement based on the channelized voltage.

In another embodiment, self-powering may also include thermoelectrically generating power based on the temperature difference between the fluid of the supply line and a fluid receiving line of the fluid receiving center to power the fluid metering member for continuous operation.

In one aspect, a smart fluid meter system and method is provided. The system includes one or more supply lines, one or more transceivers and an Artificial Neural Network (ANN). The supply lines are adapted to supply fluid to clients. Further, the transceivers are coupled to the supply lines to identify a plurality of individual events at the client end. The Artificial Neural Network (ANN) is wirelessly coupled to the one or more transceivers to receive data related to the plurality of individual events to process and automatically initiates or commands the related action at the client end. The plurality of individual events is at least a toilet flush, a shower, a washing machine cycle, and the like. Further, the related action at the client end is at least reporting the status of each of the individual events to the client, restricting the flow rate in case of failure of the toilet flush or shower or usages of fluid as per the washing machine cycle, or restricting the total volume of the fluid per day through the toilet flush or the shower or the usages of fluid as per the washing machine cycle, and the like.

In one embodiment, the transceivers and the ANN are configured to measure smallest of a volume of the fluid flow at the client end to characterize the flow patterns of the fluid at a level of granularity required for event identifications for a first time at the client end. The event identification is based on an initial flow rate of the fluid at the client end, and duration of the flow of the fluid at the client end. The event identification is further based on steady flow rate and duration of the fluid flow at the client end plus the overall volume of water during an event.

Further the smart fluid meter method includes:

supplying fluid to clients via one or more supply lines;

identifying a plurality of individual events at the client end via one or more transceivers coupled to the one ore supply lines; and receiving data related to the plurality of individual events to process and automatically initiates or commands the related action at the client end via an Artificial Neural Network (ANN) wirelessly coupled to the one or more transceivers.

In one embodiment, receiving data related to the plurality of the events includes measuring smallest of a volume of the fluid flow at the client end to characterize the flow patterns of the fluid at a level of granularity required for event identifications for a first time at the client end via the configuration of the transceivers and the ANN.

The foregoing summary describes one exemplary embodiment of the systems and methods of the present disclosure, and is not intended to be limiting. Various other embodiments are described below.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed. Further, the advantages and features of the present disclosure will better understood with reference to the following detailed description and claims taken in conjunction with the accompanying drawing, wherein like elements are identified with like symbols, and in which:

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, the terms "water" and "fluid" are interchangeable and "water" may include more than H2O and "fluid" may by simply H2O. The term "water" should be considered interchangeable with those other fluid types.

The above noted and other objects, in one aspect, potentially be achieved by a method or a system of the present disclosure. The system includes a combination of self-power generation systems, a module for data collection, a communication system for data transceiving, an artificial neural network (ANN) module for self-training and a remote data center/server.

Figure 1:
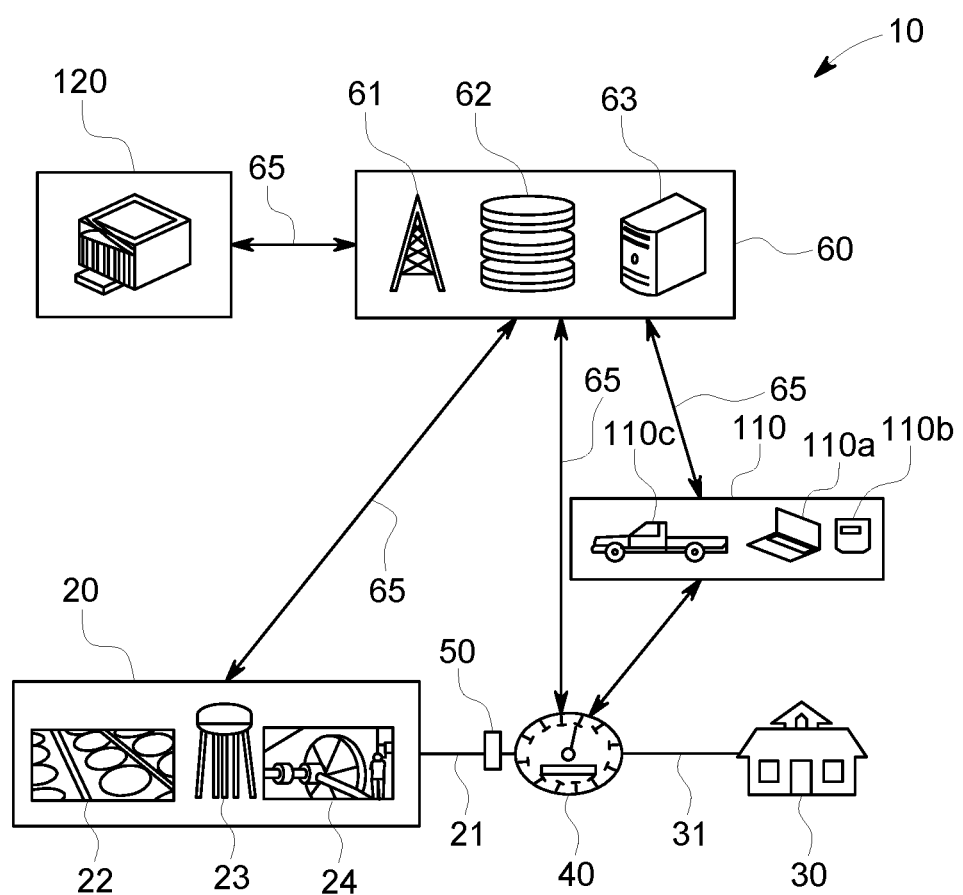
FIG. 1 illustrates an example view a fluid meter system, in accordance with an exemplary embodiment of the present disclosure.

In an example embodiment as shown in FIG. 1, a fluid meter system 10 is illustrated. As shown, the fluid meter system 10 includes at-least one fluid supplying center 20, at-least one fluid receiving center 30, at-least one fluid metering member 40, at-least one self-power generating source 50 and at-least one network operation center 60.

In one example embodiment, the fluid supplying center 20 includes at-least one supply line 21. The fluid receiving center 30 is connected to the fluid supplying center 20 via the supply line 21. In one example, fluid supply center 20 is used for the distribution of fluid to the fluid receiving center 30, for example a plurality of clients, e.g., households and businesses within a service area. The fluid supplying center 20 comprises at-least one water treatment plant 22 for water treatment operation, at-least one water storage unit 23 to store the treated water, at-least one pumping station 24 to supply the stored treated water to the water receiving center 30. Further, the fluid supplying center 20 optionally includes other facilities (not shown) suitable for receiving, treating, storing and distributing water throughout the service area.

Figure 2A:
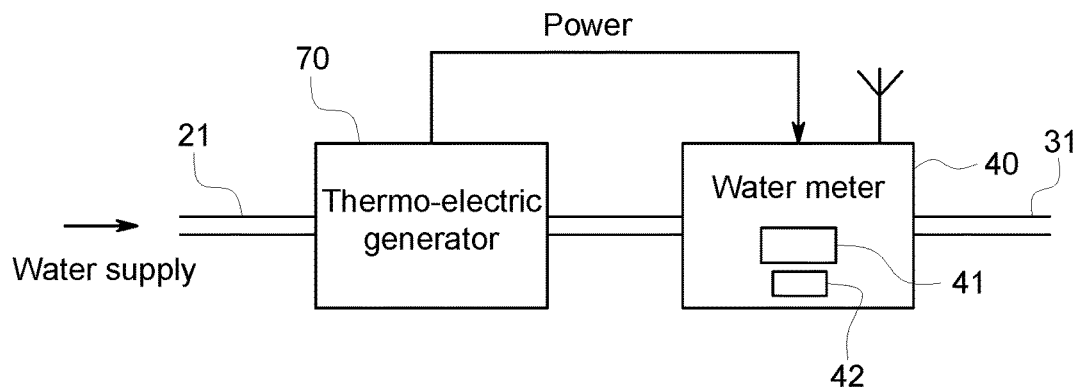
FIGS. 2A to 2E illustrates examples of self-power generating arrangement for powering the system of FIG. 1, in accordance with various exemplary embodiments of the present disclosure.

Further, the fluid metering member 40 be coupled to the supply line 21. In one embodiment, the fluid metering member 40 includes at-least one fluid regulating member 41, as shown in FIG. 2A, and at-least one data transceiver 42. The fluid regulating member 41 is configured to regulate the supply of fluid through the supply line 31. The fluid metering member 40 is primarily a water meter, and the fluid regulating member 41 is a valve or similar device associated with the water meter to regulate water flow to the client from the supply line 21. The fluid meter is operable to determine water usage of the client and control the valve functions to shut the water supply off or on for the client. Furthermore, the fluid metering member 40 includes the data transceiver 42 that is coupled to the fluid regulating member 41 to collect a plurality of data related to the supplied fluid through the supply line 21.

The network operation center 60 of the system 10 is wirelessly coupled to receive the plurality of data related to the supplied fluid through the supply line 21 via the data transceiver 42 to process and exchange relevant information or command to at-least one of the fluid supplying center 20, fluid receiving center 30 and the fluid metering member 40. The fluid metering member 40, specifically, the data transceiver 42 of the fluid metering member 40 transceives data via wireless networks 65. Primarily, the wireless network 65 is any public, private or proprietary network. The wireless network 65 includes, for example, mobile phone network (GSM/GPRS), WiFi, WiMax, local wireless network (WiFi/Zigbee), low power wide area radio network (LORA/SIGFOX), 400 MHz, 900 MHz, proprietary radio network protocols, or any other type of wireless communications protocol.

The network operations center 60 manages and monitors the distribution of water utilities (e.g. supply, consumption etc.) in the system 10. The network operations center 60 is operated by for example, a water utility company. The network operations center 60, in one example, may include a communication transceiver 61, a data server 62 and a data storage 63. The communication transceiver 61 is adapted to receive the plurality of data related to the supplied fluid through the supply line 21 by the data transceiver 42, and sends related signal or information to the data server 62. The data server 62 receives the sent signal or information from the communication transceiver 42 to process and exchange relevant information or command or data to at-least one of the fluid supplying center 20, fluid receiving center 30 and the fluid metering member 40. For example, the transceiver 42 receives radio frequency (RF) signals via the wireless network 65 and convert these signals to Internet Protocol (IP) signals, or other suitable network protocol, for transmission to the data server 62, or other components of the system 10. Furthermore, the data storage 63 store the data or information concerning client fluid usage and service area fluid usage, among other information to the data server 62.

The network operations center 60 receives data from the fluid metering member 40 concerning fluid usage of the client. The network operations center 60 receives usage alarms, notices, and the like. Moreover, the network operations center 60 sends data or instructions to the fluid metering member 40. The system 10 further includes one or more mobile field technician 110 to receive the information from the network operation center 60 and respond accordingly. The mobile field technicians 110 facilitate data collection and transmission throughout the service area associated with the system 10. For example, the network operations center 60 sends data to and receives data from the fluid metering member 40 via the mobile field technician 110. The mobile field technicians 110 includes transmitter/receiver 110a, a portable computer 110b, and cell phones or personal digital assistants (PDA) 110c, and the like, to communicate with the fluid metering device 40 and the network operation center 60 and the wireless network 65.

The system 10 also allows communication with the client concerning the status or usage of the fluid supplying center 20. For example, the network operations center 60 transmits e-mail correspondence to the client regarding alerts or notices. For example, if the network operations center 60 receives data indicating a potential water leak, the network operations center 60 requests that the client verify whether a water leak has been observed. For instance, if the service area is subject to water rationing or similar form of controlled distribution, then the network operations center 60 provides a notice to the client concerning the remaining amount of water the client is allowed to use for a given rationing period.

In further embodiment, the system 10 further include an emergency response center 120 to receive the information from the network operation center 60 and respond accordingly. The emergency response centers 120 be any city, state or federal government agency responsible for responding to emergencies and with authority to redirect or shut off utilities based on the circumstances, e.g., natural disasters or contamination. For example, the emergency response centers 120 include local fire departments, the Federal Emergency Management Agency (FEMA), the United States Department of Homeland Security (DHS), or similar entities. For example, the network operations center 60 communicate with the emergency response centers 120, via the wireless network 65, and manage the distribution of utilities throughout the system 10 in accordance with instructions received from the emergency response centers 120.

Furthermore, the self-power generating source 50 be electrically coupled to the fluid metering member 40 to generate power required to power the fluid metering member 40 for operation of the data transceiver 42 or carry out the entire process of the water/fluid meter system.

There are multiple ways of generating power such as, using thermoelectric generator source, water battery source, radio spectrum source, turbine and the like, as depicted in FIGS. 2A to 2E.

Figure 3A:
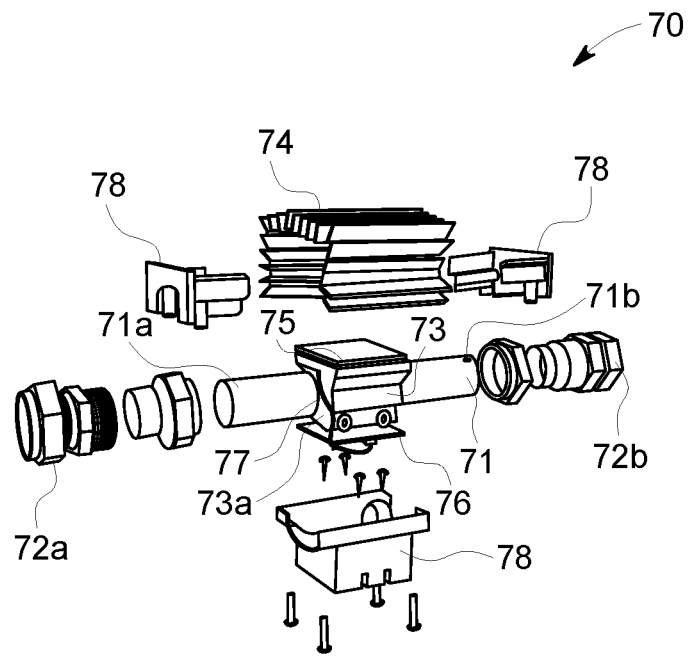
FIGS. 3A and 3B, respectively, illustrates exploded and assembled views a thermoelectric generator power source 70 for self-powering the system of FIG. 1, in accordance with an exemplary embodiment of the present disclosure.
Figure 3B:
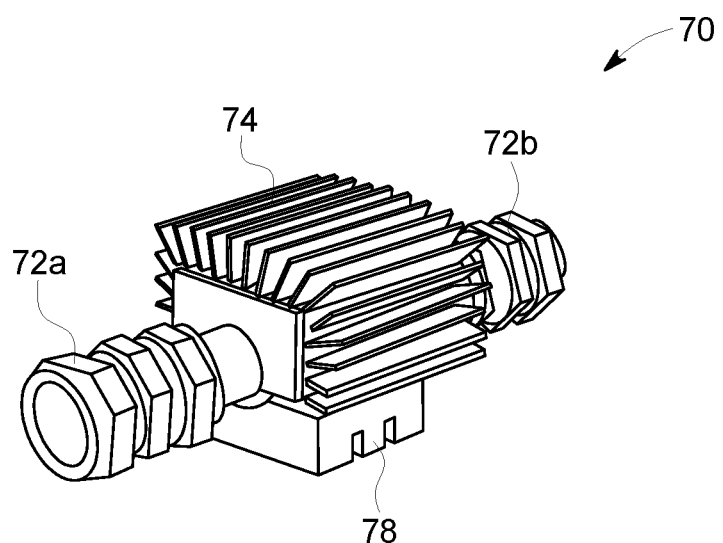

In one preferred embodiment, the self-power generating source 50 is a thermoelectric generator power source 70, as shown in FIG. 2A. The thermoelectric generator power source 70, in one example be based on a Peltier device to generate power based on heat differences of surrounding and fluid. As per this example embodiment, as shown in FIGS. 3A and 3B, the thermoelectric generator power source 70 include an arrangement of a through pipe 71 having couplers 72a, 72b, a thermal transfer block 73, a heat-sink element 74, a Peltier device 75, a printed-circuit board (PCB) 76, and, a casing configuration 78 to accommodate and support the arrangement of the through pipe 71, the thermal transfer block 73, the heat-sink element 74, the Peltier device 75 and the PCB 76. The through pipe 71 having the couplers 72a, 72b that are respectively coupled at both opposite end portions 71a, 71b, of the through pipe 71 to be coupled with supply pipe 21 to enable the flow of fluid therethrough. In general example, the fluid flowing through the supply line 21 and through the through pipe 71 be cold fluid. Further, the thermal transfer block 73 includes a through recess 73a to accommodate the through pipe 71 and sense the temperature of the fluid. The heat-sink element 74 be adapted to sense ambient air temperature from surrounding. The ambient air temperature in a general example be higher temperature than the fluid, otherwise, vice versa may also be possible. The Peltier device 75 be disposed around the thermal transfer block 73 and covered via the heat-sink element 74 to be in direct contact therewith to sense and convert the temperature differential across the heat sink element 74 and the through pipe 71, and resulting heat flow therethrough, into a voltage. The PCB 76 be disposed around the thermal transfer block 73 and electrically coupled (by coupling means 77) to the Peltier device 75 to supply the voltage to the fluid metering member 40 for continuous operation.

Figure 3C:
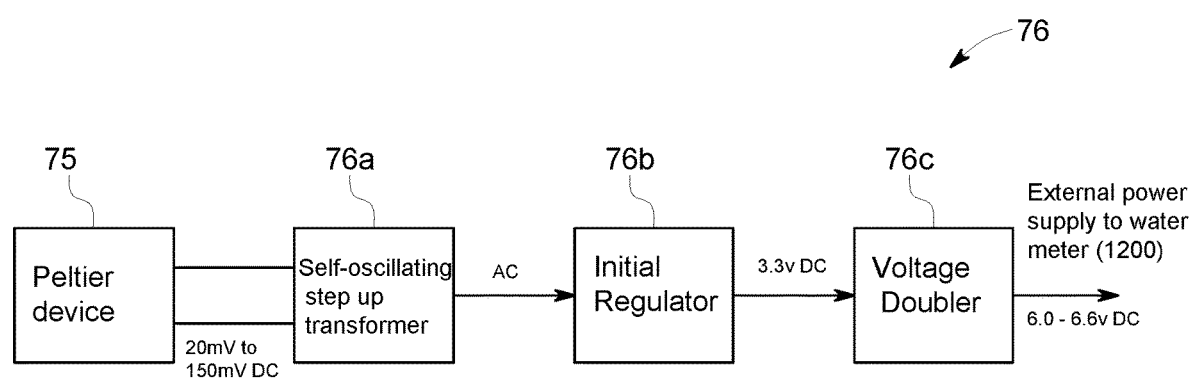
FIG. 3C illustrates an example block diagram of a PCB for self-powering the system of FIG. 1, in accordance with an exemplary embodiment of the present disclosure.

In one embodiment, as shown in FIG. 3C, the PCB 76 connects to a Peltier device 75 and includes a self-oscillating step up transformer 76a and an initial regulator 76b for channelizing the voltage. Further, the PCB 76 also includes a voltage doubler 76c to generate a resultant voltage up to the right level depending upon the requirement based on the channelized voltage.

In one embodiment, the self-power generating source 50 also be a thermoelectric generator power source that be configure to generate power based on the temperature difference between the fluid, such as, where the indoor temperature is likely to be in excess of 17° C. whereas the water coming into a dwelling be approximately 12° C. This temperature differential allows use of a thermoelectric generator to draw a few mill watts of power to the fluid metering device 40 or also that can be used to charge up the battery, if any. In such example embodiment, the fluid receiving center 30 be coupled to the supply line 21 via at-least one fluid receiving line 31, and the fluid metering member 40 is placed between the supply line 21 and the fluid receiving line 31. In such embodiment, the self-power generating source 50, also be a thermoelectric generator power source that is configured to generate power based on the temperature difference between the fluid of the supply line 21 and the fluid receiving line 31 to power the fluid metering member 40 for continuous operation, as compared to ambient air temperature.

Figure 2B:
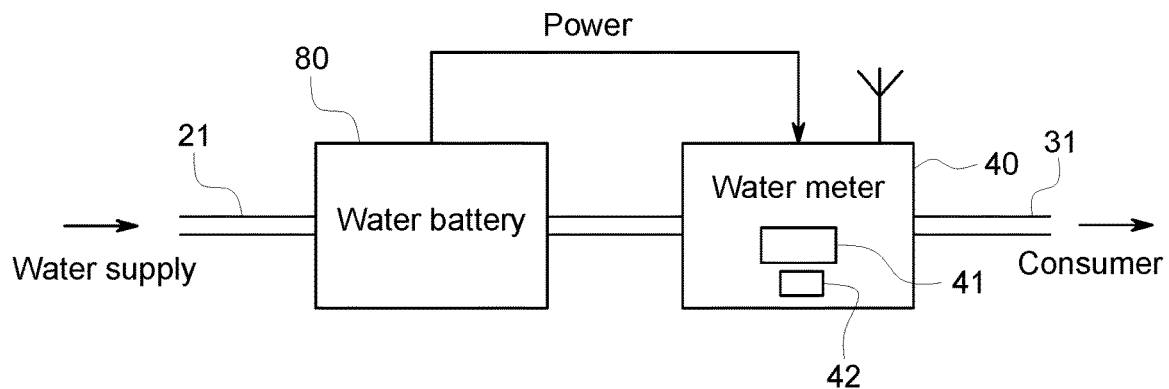

In one embodiment, as shown in FIG. 2B, the self-power generating source 50 is a water battery source 80 having a plurality of water containing containers to generate power to power the fluid metering member 40 for continuous operation. The water battery source 80 makes a battery which generates electricity simply by connecting a number of isolated compartments containing tap water.

Figure 2C:
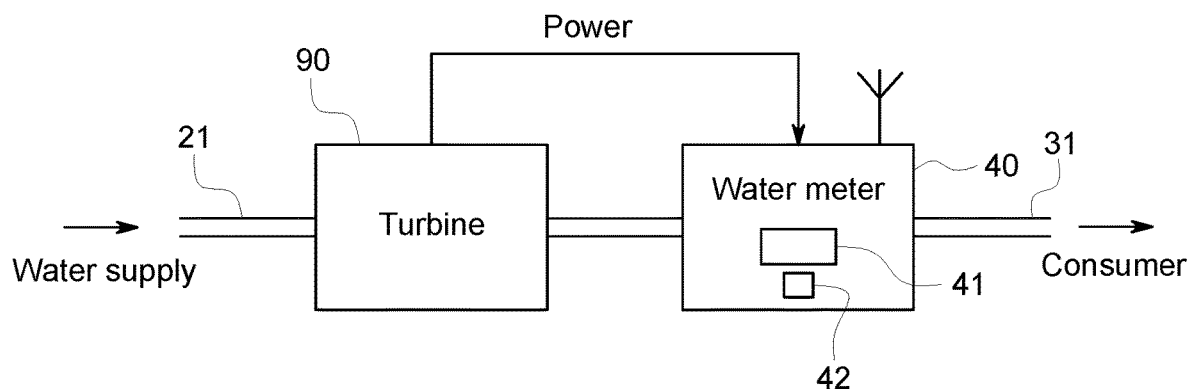
Figure 2D:
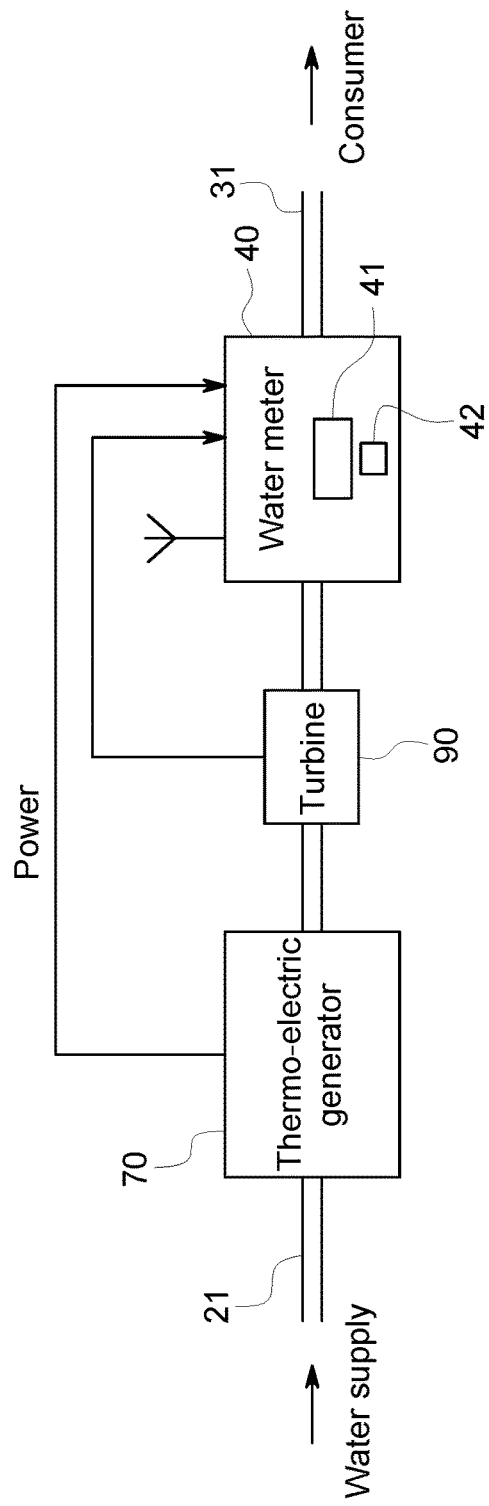

In another embodiment, as shown in FIG. 2C, the self-power generating source 50 is a turbine power generation source 90 to generate power to power the fluid metering member 40 for continuous operation. In one further embodiment, as shown in FIG. 2D, the turbine power generation source 90 and the thermoelectric generator power source 70 in combination be adapted to generate power to power the fluid metering member 40 for continuous operation.

Figure 2E:
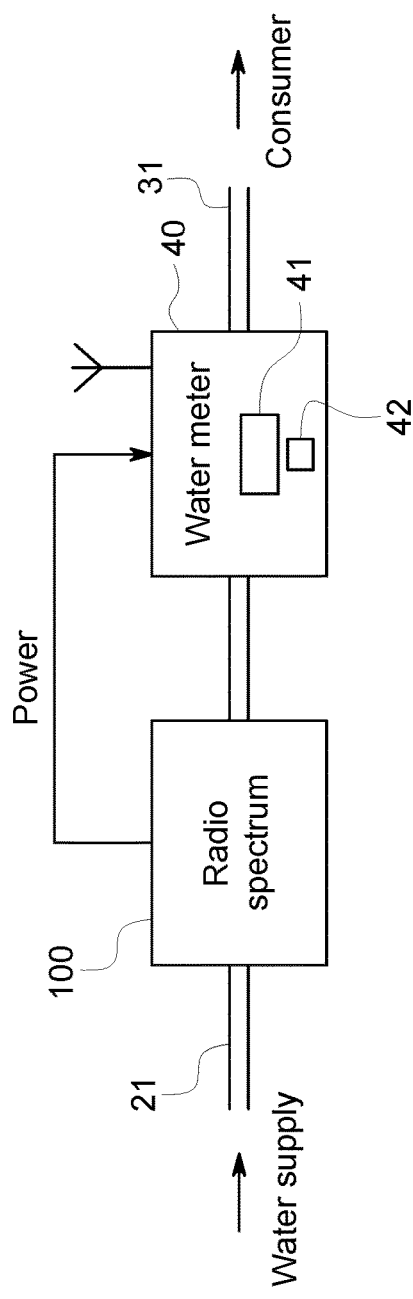

In yet another embodiment, as shown in FIG. 2E, the self-power generating source 50 is a radio spectrum power generating source 100 adapted to generate power to power the fluid metering member 40 for continuous operation. The radio spectrum source 100 generates electricity from ambient radio signals in the air.

In one embodiment, the system 10 further includes a rechargeable battery (not shown) to store the power generated by any or all the self-power generating source 50.

All the self-power generating sources, such as the turbine power generation method and/or the radio spectrum method and/or a water battery method and/or a thermoelectric generator method be used as per preference of the user. Specifically, for the turbine power generation source 90 used in the present fluid metering member 40 is an improvement of traditionally used turbine power generation methods. In the traditional turbine power generation, use of some off-the shelf turbines cause an unacceptable drop in water pressure due to splitting the water stream into two or more water stream inlets as described in WO2014100496 titled "water meter systems and methods". Our internal research suggests that some water/fluid meters work acceptably even without splitting the water stream into two or more inlets as described in WO2014100496. Most of the traditional turbine power generation systems available use a restrictive jet and turbine which dramatically reduces the pressure and introduces an unacceptable blockage risk within the water meter. The turbine power generation system used in the present water/fluid system is an off-the-shelf generator that can deliver an acceptable water pressure continuously.

Figure 4:
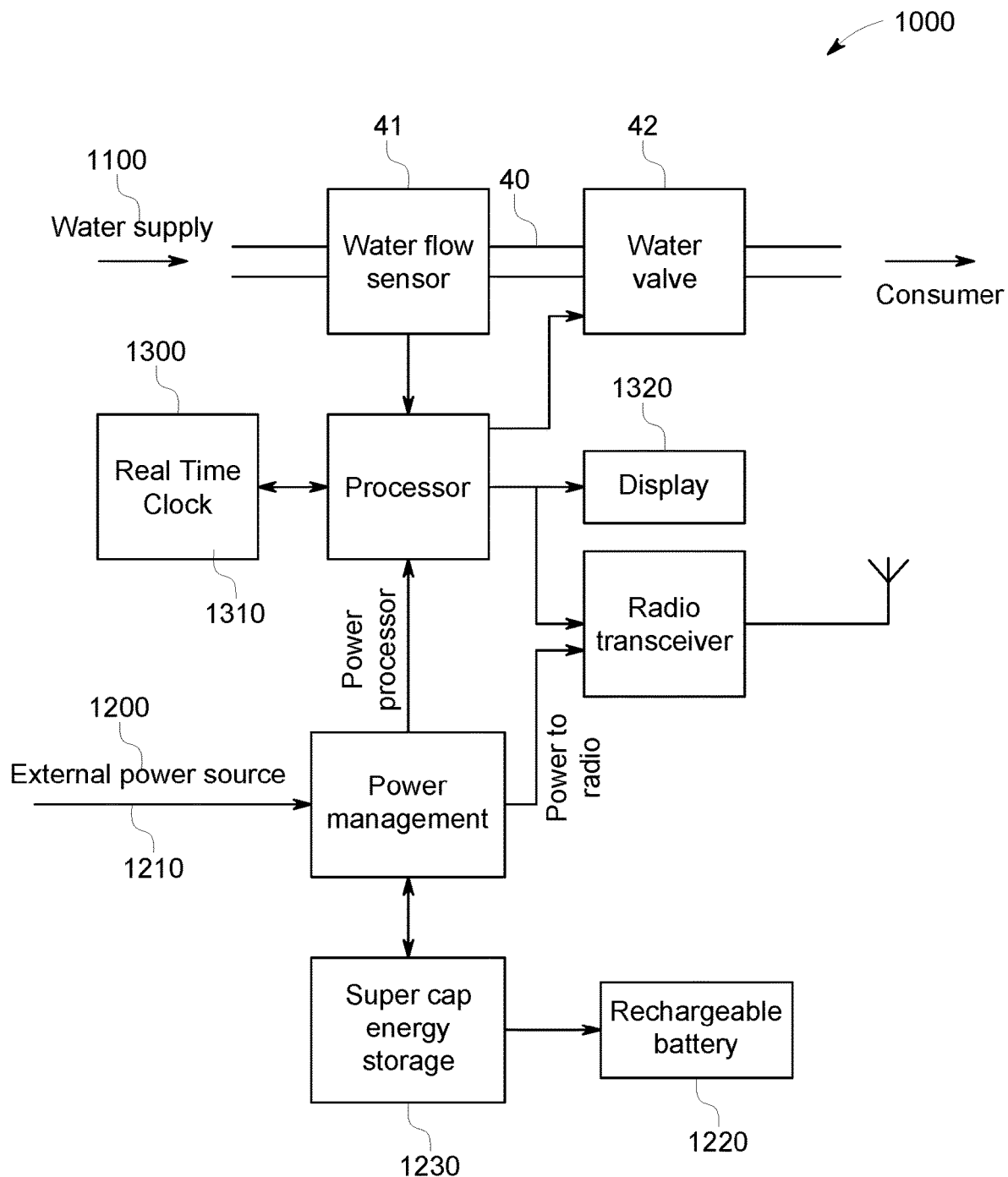
FIG. 4 illustrates an example block diagram of a fluid management system, in accordance with additional exemplary embodiment of the present disclosure.

In one further embodiment, an external source of power is used to supply energy to the water/fluid meter system. The example of such an embodiment is depicted in FIG. 4 by the way of a fluid management system 1000, associated with the system 10. The system 1000 include a fluid flow arrangement 1100, a power management arrangement 1200 and a processing arrangement 1300. The fluid flow arrangement 1100 includes connection from at-least one fluid supplying center 20 to at-least one fluid receiving center 30 via a supply line 21. The flow arrangement having at-least one fluid metering member, such as the fluid metering device 40, coupled to the supply line 21. Further, the power management arrangement 1200 be coupled to the fluid flow arrangement 1100 to enable fluid flow. The power management arrangement 1200 include at-least one power generating source 1210 and a rechargeable battery 1220 to be charged by the power generating source 1210. Furthermore, the processing arrangement 1300 include a real time clock 1310, coupled to the fluid flow arrangement 1100 to receive the plurality of data, and coupled to the power management arrangement 1200 to be powered. The real time clock 1310 adapted to time-stamp events and wake-up processing arrangement to send the plurality of data on the real time basis.

In such embodiment of the fluid management system 1000, the power management arrangement 1200 includes the power generation system that be associated with a power management module. Further, the power management module be used to recharge the battery 1220 and optimize the use of recharged battery. Further, it is well known in the art that continuously 'trickle' charging of battery diminishes the life of a battery and reduces its storage capacity over time. In the traditional water/fluid meter system, this is an issue as the water flows regularly throughout the day. In the present system 1000, 10, a super capacitor (SuperCap) 1230 is used into the system to utilize most of the available energy without draining the battery continuously.

Furthermore, in such embodiment, a real-time clock 1310 be optionally incorporated into the system. The real-time clock 1310 be used to time-stamp events and to "wake-up" the electronics at predetermined times, for example, to send a daily meter reading. Thus, the present water/fluid meter system be a time bands (e.g. hourly) water/fluid meter system also.

Furthermore, in such embodiment, the system 10, 1000 optionally comprises a display or screen 1320. The display 1320 is used to show normal "total volume" meter value and status of the water meter.

Furthermore, the data collection module/water measuring module is optionally used with the system 1000 to measure the total volume of water used.

Moreover, in further example embodiment, a water measuring unit is provided to communicably connect to the real time clock 1310. Further, the real time clock 1310 along with water measuring unit calculates the amount of flow of water per unit of time and the duration of the day.

Further in other example embodiment, the system 10, 1000 includes various transceivers and a communicating medium for respective purposes.

Further in yet another example embodiment, the transceivers are communicably associated with the data collection module and the remote server. Further, the transceivers are used to transmit and receive data across the communicating medium.

In other example embodiment, a remote server is provided that receives the information from the data collection module. Further, the remote server comprises a processor and a memory.

Further, the processor (remote processor) processes the information received from the module of data collection and on the basis of the information stored in the memory, the processor commands the water meter to shut down the flow of water in case of any leakage or excessive flow. Further, the processor also remotely calibrates the smart water meter to recognize a number of other events such as changing of threshold volume etc.

In other example embodiment, a water-shut off unit (not shown) is provided. In such water shut off unit, the water flow does not switched off completely, but limited either by restricting the flow rate or restricting the total volume per day to a fixed amount (or a combination of the two).

In further example embodiment, a smart system may be provided. The system 10 or 1000 may also act as smart system. The smart system optionally comprises an Artificial Neural Network (ANN) module for self-training. The self-trained smart system identifies individual events (toilet flush, shower, washing machine cycle etc.) and automatically initiate the related action such as but not limited to reporting the event, restricting the flow rate or restricting the total volume per day etc. The smart system is able to measure usage down to small volume (e.g. 100 ml) and send the data back to the server enabling the company to characterize the flow patterns at the level of granularity required for event identification for the first time. The regular transmission of flow and other data is an energy intensive process which is the main reason that the existing smart meters do not transmit data at this level of granularity. Event identification in the exemplary implementations is based on the initial flow rate and duration, the steady flow rate and duration plus the overall volume of water during the event.

Figure 5:
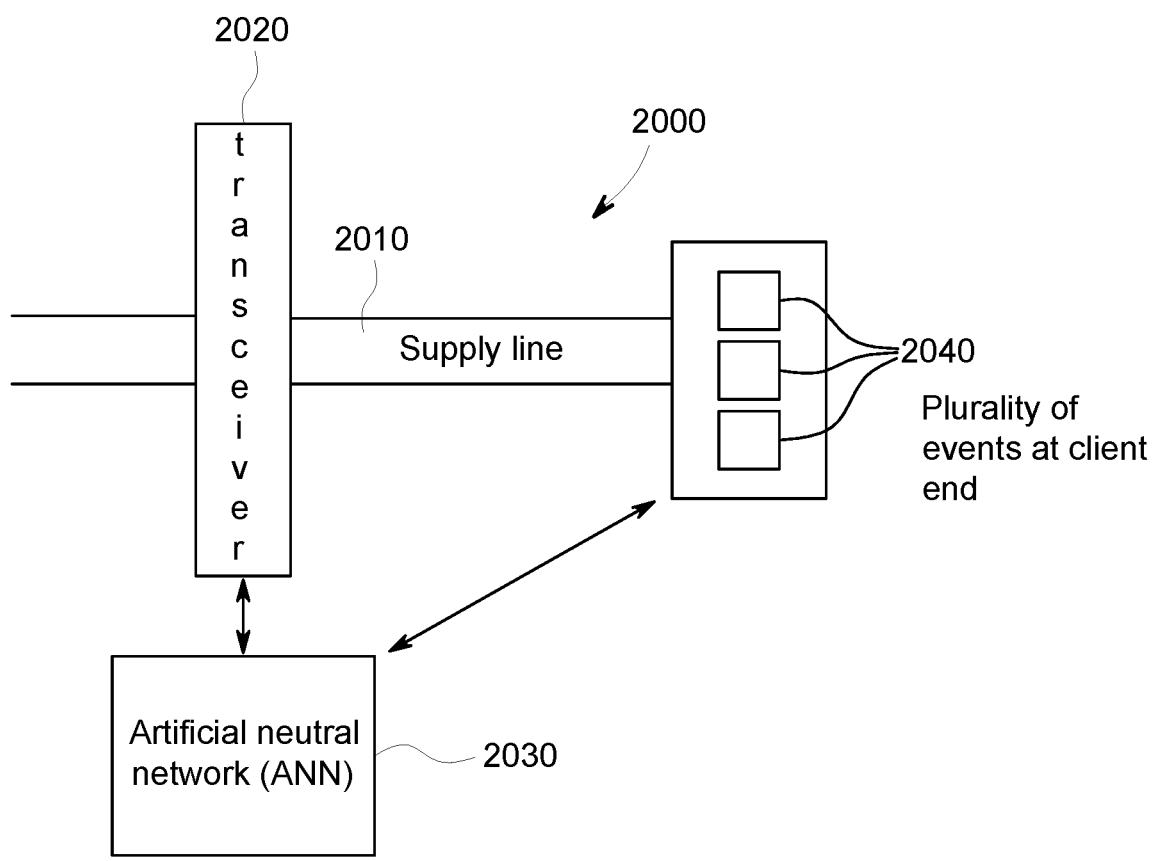
FIG. 5 illustrates a smart fluid meter system, in accordance with an exemplary embodiment of the present disclosure; and Like reference numerals refer to like parts throughout the description of several views of the drawings.

Such a smart fluid meter system, in one embodiment as depicted in example FIG. 5 and shown by numeral 2000, includes one or more supply lines 2010, one or more transceivers 2020 and an Artificial Neural Network (ANN) 2030. The supply lines 2010 are adapted to supply fluid to clients. Further, the transceivers 2020 are coupled to the supply lines 2010 to identify a plurality of individual events 2040 at the client end. The Artificial Neural Network (ANN) 2030 is wirelessly coupled to the one or more transceivers 2020 to receive data related to the plurality of individual events to process and automatically initiates or commands the related action at the client end. The plurality of individual events 2040 is at least a toilet flush, a shower, a washing machine cycle, and the like. Further, the related action at the client end is at least reporting the status of each of the individual events 2040 to the client, restricting the flow rate in case of failure of the toilet flush or shower or usages of fluid as per the washing machine cycle, or restricting the total volume of the fluid per day through the toilet flush or the shower or the usages of fluid as per the washing machine cycle, and the like.

In one embodiment, the transceivers 2020 and the ANN 2030 are configured to measure smallest of a volume of the fluid flow at the client end to characterize the flow patterns of the fluid at a level of granularity required for event identifications for a first time at the client end. The event identification is based on an initial flow rate of the fluid at the client end, and duration of the flow of the fluid at the client end. The event identification is further based on steady flow rate and duration of the fluid flow at the client end plus the overall volume of water during an event.

In one embodiment, a smart fluid meter method is provided. The method includes:
supplying fluid to clients via one or more supply lines 2010;
identifying a plurality of individual events at the client end via one or more transceivers 2020 coupled to the one ore supply lines 2010; and
receiving data related to the plurality of individual events to process and automatically initiates or commands the related action at the client end via an Artificial Neural Network (ANN) 2030 wirelessly coupled to the one or more transceivers 2020.

In one embodiment, receiving data related to the plurality of the events includes measuring smallest of a volume of the fluid flow at the client end to characterize the flow patterns of the fluid at a level of granularity required for event identifications for a first time at the client end via the configuration of the transceivers and the ANN 2030.

In one embodiment, a smart water meter method is provided. The method includes the steps of:
flowing fluid from at-least one fluid supplying center 20 to at-least one fluid receiving center 30 via at-least one supply line 21;
collecting plurality of data related to the supplied fluid through the supply line 21 via a fluid metering member 40 and sending the said data in the network;
Self-powering the fluid metering member 40 coupled to the supply line 21 to continuous operation data collecting and sending; and
receiving the plurality of data related to the supplied fluid through the supply line and processing the said data to act accordingly.

The self-powering step further includes thermoelectrically charging the fluid metering devices via a thermoelectric generator power source 70. The thermoelectric generator power source 70 includes:
a through pipe 71 having couplers 72a, 72b at both opposite end portions 71a, 71b, the through pipe 71 enable a flow of fluid therethrough, the fluid being cold;
a thermal transfer block 73 having a through recess 73a to accommodate the through pipe 71 and sense the temperature of the fluid;
a heat-sink element 74 adapted to sense ambient air temperature from surrounding, the ambient air temperature being hotter;
a Peltier device 75 disposed around the thermal transfer block 73 and covered via the heat-sink element 74 to be in direct contact therewith to sense and convert the temperature differential across the heat sink element 74 and the through pipe 71, and resulting heat flow therethrough, into a voltage; and
a printed-circuit board (PCB) 76 disposed around the thermal transfer block 73 and electrically coupled (by coupling means 77) to the Peltier device 75 to supply the voltage to the fluid metering member 40 for continuous operation, wherein the PCB 76 includes:
a self-oscillating step up transformer 76a and an initial regulator 76b for channelizing the voltage; and
a voltage doubler 76c to generate a resultant voltage up to the right level depending upon the requirement based on the channelized voltage.

In other embodiment, the self-powering step also include thermoelectrically generating power based on the temperature difference between the fluid of the supply line 21 and a fluid receiving line 31 of the fluid receiving center 30 to power the fluid metering member 40 for continuous operation.

It is to be understood that the above description is intended to be illustrative, and not restrictive. For example, the above-discussed embodiments be used in combination with each other. Many other embodiments will be apparent to those of skill in the art upon reviewing the above description.

While the present disclosure has been described with reference to particular embodiments, it should be understood that the embodiments are illustrative and that the scope of the disclosure is not limited to these embodiments. Many variations, modifications, additions and improvements to the embodiments described above are possible. It is contemplated that these variations, modifications, additions and improvements fall within the scope of the disclosure.

Plural instances may be provided for components, operations or structures described herein as a single instance. Finally, boundaries between various components are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A fluid meter system, comprising:
at-least one fluid supplying center having at-least one supply line;
at-least one fluid receiving center connected to the fluid supplying center via the supply line;
at-least one fluid metering member coupled to the supply line, the fluid metering member having, at-least one fluid regulating member to regulate the supply of fluid through the supply line, and at-least one data transceiver coupled to the fluid regulating member to collect a plurality of data related to the supplied fluid through the supply line;
at-least one self-power generating source, separate from the at-least one fluid metering member, coupled to the supply line and enables the fluid flowing through the at-least one supply line, to flow therefrom, the at-least one self-power generating source coupled to the supply line before the at-least one fluid metering member, wherein the at-least one self-power generating source is electrically coupled to the fluid metering member to generate power required to power the fluid metering member for operation of the data; and
at-least one network operation center wirelessly coupled to receive the plurality of data related to the supplied fluid through the supply via the data transceiver to process and exchange relevant information or command to at-least one of the fluid supplying center, fluid receiving center and the fluid metering member,
wherein the self-power generating source is a thermoelectric generator power source, the thermoelectric generator power source comprising:
a through pipe having opposite end portions, and couplers at both opposite end portions, the through pipe enable the fluid flowing through the at-least one supply line, to flow therefrom, the fluid being at a predetermined temperature, wherein the couplers couple the through pipe from the opposite end portions to the supply line before the at-least one fluid metering member;
a thermal transfer block having a through recess to accommodate the through pipe at a substantially center position of the through pipe and sense the temperature of the fluid of the supply line flowing through the through pipe;
a heat-sink element disposed over the thermal transfer block to sense ambient air temperature from surrounding, the ambient air temperature being higher than at the predetermined temperature; and
a Peltier device disposed around the thermal transfer block and covered via the heat-sink element to be in direct contact therewith to sense and convert the temperature differential across the heat sink element and the through pipe, and resulting heat flow therethrough, into a voltage.

2. The fluid meter system of claim 1, wherein the thermoelectric generator power source further comprises:
a printed-circuit board (PCB) disposed around the thermal transfer block and electrically coupled to the Peltier device to supply the voltage to the fluid metering member for continuous operation.

3. The fluid meter system of claim 2, wherein the PCB comprises:
a self-oscillating step up transformer and an initial regulator for channelizing the voltage; and
an optional voltage step-up to generate a resultant voltage up to the right level depending upon the requirement based on the channelized voltage.

4. The fluid meter system of claim 2, wherein the thermoelectric generator power source comprises: a casing configuration having
plurality of casing members,
wherein at least two casing members of the plurality of casing members are disposed transversally facing each other to accommodate and support the through pipe, the thermal transfer block, the heat-sink element and the Peltier device and the PCB from sides, and
while at least one casing member of the plurality of casing members is disposed laterally to accommodate and support an arrangement of the through pipe, the thermal transfer block, the heat-sink element, the Peltier device and the PCB.

5. The fluid meter system of claim 1, wherein the fluid receiving center is coupled to the supply line via at-least one fluid receiving line, and the fluid metering member is placed between the supply line and the fluid receiving line.

6. The fluid meter system of claim 5, wherein the self-power generating source is a thermoelectric generator power source coupled at a joining position of the supply line and the fluid receiving line to generate power based on the temperature difference between the fluid of the supply line and the fluid receiving line to power the fluid metering member for continuous operation.

7. The fluid meter system of claim 1, wherein a turbine power generation source in combination with the thermoelectric generator power adapted to generate power to power the fluid metering member for continuous operation.

8. The fluid meter system of claim 1 further comprising a rechargeable battery to store the power generated by the self-power generating source.

9. A fluid meter system of claim 1, wherein the network operation center comprises:
a communication transceiver to receive the plurality of data related to the supplied fluid through the supply line by the data transceiver, and send related signal or information;
a data server to receive the sent signal or information from the communication transceiver to process and exchange relevant information or command or data to at-least one of the fluid supplying center, fluid receiving center and the fluid metering member; and
a data storage to store the data or information from the data server.

10. A fluid meter system of claim 1 further comprising an emergency response center to receive the information from the network operation center and respond accordingly.

11. A fluid management system, comprising:
a fluid flow arrangement from at-least one fluid supplying center to at-least one fluid receiving center via a supply line, the flow arrangement having at-least one fluid metering member coupled to the supply line, the fluid metering member having,
at-least one fluid regulating member to regulate the supply of fluid through the supply line, and at-least one data transceiver coupled to the fluid regulating member to collect a plurality of data related to the supplied fluid through the supply line;
a power management arrangement coupled to the fluid flow arrangement to enable fluid flow, the power management arrangement comprising at-least one self-power generating source, separate from the at-least one fluid regulating member; and
a processing arrangement having a real time clock and coupled to the fluid flow arrangement to receive the plurality of data, and to the power management arrangement to be powered, the real time clock adapted to time-stamp events and wake-up processing arrangement to send the plurality of data on the real time basis,
wherein the self-power generating source is a thermoelectric generator power source, the thermoelectric generator power source comprising:
a through pipe having opposite end portions, and couplers at both opposite end portions, the through pipe enable a flow of fluid therethrough, the fluid being at a predetermined temperature, wherein the couplers couple the through pipe to the supply line before the at-least one fluid metering member;
a thermal transfer block having a through recess to accommodate the through pipe at a substantially center position of the through pipe and sense the temperature of the fluid;
a heat-sink element disposed over the thermal transfer block to sense ambient air temperature from surrounding, the ambient air temperature being higher than at the predetermined temperature; and
a Peltier device disposed around the thermal transfer block and covered via the heat-sink element to be in direct contact therewith to sense and convert the temperature differential across the heat sink element and the through pipe, and resulting heat flow therethrough, into a voltage.

12. A fluid meter method, comprising:
flowing fluid from at-least one fluid supplying center to at-least one fluid receiving center via at-least one supply line;
collecting plurality of data related to the supplied fluid through the supply line via a fluid metering member and sending the said data;
self-powering the fluid metering member coupled to the supply line to continuous operation collecting and sending data; and
receiving the plurality of data related to the supplied fluid through the supply line and processing the said data to act accordingly,
wherein self-powering comprises a self-powering by a self-power generating source of a thermoelectric generator type power source, at-least one self-power generating source coupled to the supply line and enables the fluid flowing through the at-least one supply line, to flow therefrom, the at-least one self-power generating source coupled to the supply line before the at-least one fluid metering member, wherein the at-least one self-power generating source is electrically coupled to the fluid metering member to generate power required to power the fluid metering member for operation of the data, the thermoelectric generator power source comprising:
a through pipe having opposite end portions, and couplers at both opposite end portions, the through pipe enable a flow of fluid therethrough, the fluid being at a predetermined temperature, wherein the couplers couple the through pipe to the supply line before the at-least one fluid metering member;
a thermal transfer block having a through recess to accommodate the through pipe at a substantially center position of the through pipe and sense the temperature of the fluid;
a heat-sink element disposed over the thermal transfer block to sense ambient air temperature from surrounding, the ambient air temperature being higher than at the predetermined temperature; and
a Peltier device disposed around the thermal transfer block and covered via the heat-sink element to be in direct contact therewith to sense and convert the temperature differential across the heat sink element and the through pipe, and resulting heat flow therethrough, into a voltage.

13. The fluid meter method of claim 12, wherein the thermoelectric generator power source further comprises:
a printed-circuit board (PCB) disposed around the thermal transfer block and electrically coupled to the Peltier device to supply the voltage to the fluid metering member for continuous operation, wherein the PCB comprises:
a self-oscillating step up transformer and an initial regulator for channelizing the voltage; and an optional voltage step-up to generate a resultant voltage up to the right level depending upon the requirement based on the channelized voltage.

* * * * *